June 11, 1940.  J. H. PAISLEY  2,203,922
LINE COUPLING
Filed Nov. 14, 1938
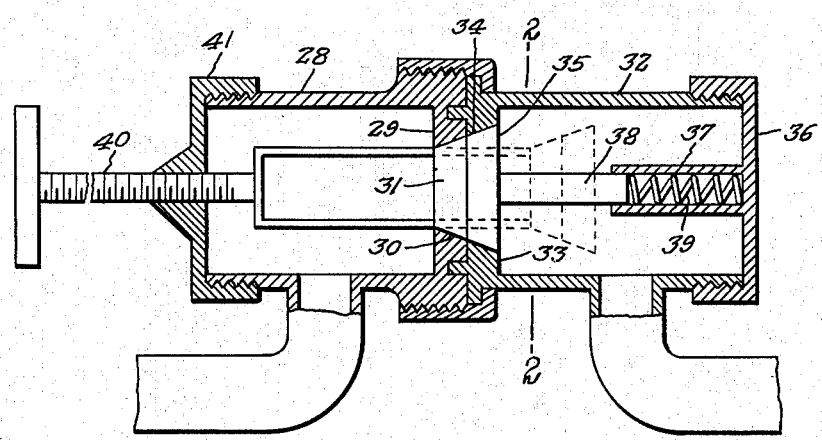
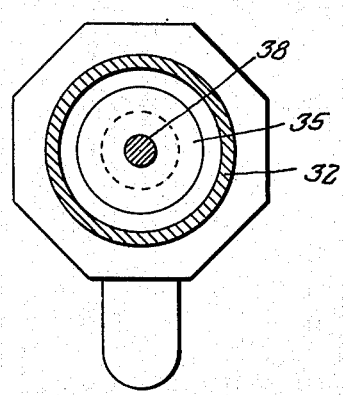
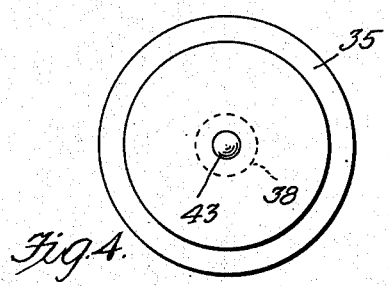
Inventor
John H. Paisley.
By Clarence A. O'Brien
and Hyman Berman
Attorneys Patented June 11, 1940

2,203,922

UNITED STATES PATENT OFFICE 2,203,922

LINE COUPLING

John H. Paisley, Elmira, N. Y.

Application November 14, 1938, Serial No. 240,384

2 Claims. (Cl. 284—17)

This invention relates to couplings for hydraulic, fluid, or lines for connecting two sections of such line together and an object of the invention is to provide a coupling whereby such sections may be connected or disconnected without the loss of the air or liquid and without the entrance of air into the line.

The invention together with its objects and advantages will be best understood from a study of the following description taken in connection with the accompanying drawing wherein:

Figure 1 is a view partly in section and partly in elevation showing my invention.

Figure 2 is a vertical transverse sectional view taken substantially on the line 2—2 of Figure 1.

Figure 3 is an enlarged fragmentary vertical transverse sectional view of the valve head.

Figure 4 is a front elevational view of one of the valve head members.

Referring now to the drawing by reference numerals it will be seen that the invention comprises a pair of the cylinders, 28 and 32 arranged in tandem. The cylinder 28 has its end wall 29 provided with a tapered valve seat 30 to accommodate the valve disk 31 that opens outwardly of the cylinder 28. Cylinder 32 has its end wall 33 provided with a seat 34 against which the valve disk 35 seats.

The cap 36 for the cylinder 32 is provided with an inwardly extending guide socket 37 which receives a pilot pin 38 provided for the valve 35.

Disposed within the guide socket 37 is a coil spring 39 that at one end impinges against the inner side of the cap 36 and at an opposite end impinges against the pilot pin 38 normally urging the valve disk 35 into seating engagement with the valve seat 34.

The valve disk 31 is suitably connected to a screw threaded operating stem 40 which is mounted in the threaded cap 41.

The valve disk 31 has formed therein a tapered socket 42 for receiving the tapered projection 43 on the valve disk 35 as shown in Figure 3 of the drawing.

Obviously, when it is desired to have a free flow of air or fluid through the coupling valves 31 and 35 are in open position. When, however, it is desired to uncouple the section of a line the valve disk 31 is seated by turning the threaded stem 40. When the valve disk 31 is seated in the seat 30 the spring 39 urges the valve disk 35 into the seat 34. Thereafter the cylinders 28 and 32 may be uncoupled without the escape of air or other fluid.

It will thus be seen that I have provided a coupling for hydraulic power and vehicle brake lines that is simple in design, inexpensive to construct and will otherwise meet the requirements of a coupling of this character.

What is claimed:

1. A coupling of the character described comprising a pair of cylinders adapted to be arranged in tandem, coupling means for the cylinders at the meeting ends thereof, each of said cylinders being provided with a nipple for connection of the cylinders to a section of a hose or analogous line, one of said cylinders at the meeting end thereof being provided with an external valve seat and the other of said cylinders at the meeting end thereof being provided with an internal valve seat, valves operating in one of said cylinders for engagement with said valve seats, a stem accessible exteriorly of the other cylinder for unseating the valves, and compressible means for normally seating said valves.

2. A coupling of the character described comprising a pair of cylinders adapted to be arranged in tandem, a coupling means for the cylinders at the meeting ends thereof, each of said cylinders being provided with a nipple for connection of the cylinders to a section of a hose or analogous line, one of said cylinders at the meeting end thereof being provided with an external valve seat and the other of said cylinders at the meeting end thereof being provided with an internal valve seat, valves operating in one of said cylinders for engagement with said valve seats, one of said valves having a tapered socket therein for the reception of a tapered projection on the other of said valves, a stem accessible exteriorly of one of said cylinders for unseating the valves, and compressible means housed within the other of said cylinders for normally seating said valves.

JOHN H. PAISLEY.